United States Patent
Heo et al.

(10) Patent No.: US 7,559,277 B2
(45) Date of Patent: Jul. 14, 2009

(54) INK PATTERN PRINTING APPARATUS, METHOD OF FORMING INK PATTERN USING THE PRINTING APPARATUS AND METHOD OF MANUFACTURING LIQUID CRYSTAL DISPLAY

(75) Inventors: Jung-uk Heo, Seongnam-si (KR); Bong-sung Seo, Yongin-si (KR); Byoung-hun Sung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 294 days.

(21) Appl. No.: 11/446,313

(22) Filed: Jun. 2, 2006

(65) Prior Publication Data

US 2007/0051257 A1    Mar. 8, 2007

(30) Foreign Application Priority Data

Sep. 6, 2005   (KR) .................... 10-2005-0082834

(51) Int. Cl.
*B41F 31/00* (2006.01)
*B41F 9/10* (2006.01)
*B41F 3/36* (2006.01)
*B41M 1/12* (2006.01)

(52) U.S. Cl. .............. 101/337; 101/150; 101/167; 101/158

(58) Field of Classification Search ........... 101/150, 101/170, 337, 167, 158
See application file for complete search history.

(56) References Cited

U.S. PATENT DOCUMENTS

| 5,992,320 | A | * | 11/1999 | Kosaka et al. ........... 101/401.1 |
| 5,996,488 | A | * | 12/1999 | Yanagisawa et al. ........ 101/170 |
| 6,267,052 | B1 | * | 7/2001 | Hill et al. .................... 101/211 |
| 7,140,296 | B2 | * | 11/2006 | Baek et al. .................. 101/170 |
| 7,312,094 | B2 | * | 12/2007 | Yi et al. ........................ 438/30 |
| 2007/0022887 | A1 | * | 2/2007 | Seo et al. .................... 101/337 |
| 2007/0131124 | A1 | * | 6/2007 | Heo et al. ................... 101/216 |

FOREIGN PATENT DOCUMENTS

| JP | 2000-035582 | 2/2000 |
| KR | 10-2003-0015778 | 2/2003 |
| KR | 10-2004-0072849 | 8/2004 |

\* cited by examiner

*Primary Examiner*—Ren Yan
*Assistant Examiner*—Leo T Hinze
(74) *Attorney, Agent, or Firm*—F. Chau & Associates, LLC

(57) ABSTRACT

An ink pattern printing apparatus comprises a lower frame comprising a printing plate having at least one recess, and an upper frame comprising an ink supply device supplying ink onto the printing plate, a removing blade removing residual ink on an upper surface of the printing plate by releasing a pressurized gas through an exhaust port in the removing blade, and a transfer roller having a transfer sheet, wherein the transfer sheet receives transfer of ink from the at least one recess.

13 Claims, 13 Drawing Sheets

INK PATTERN PRINTING APPARATUS, METHOD OF FORMING INK PATTERN USING THE PRINTING APPARATUS AND METHOD OF MANUFACTURING LIQUID CRYSTAL DISPLAY

This application claims priority to Korean Patent Application No. 10-2005-0082834 filed on Sep. 6, 2005, the disclosure of which is incorporated by reference herein in its entirety.

BACKGROUND OF THE INVENTION

1. Technical Field

The present disclosure relates to an ink pattern printing apparatus, and more particularly, to an ink pattern printing apparatus including a blade, a method of forming an ink pattern using the ink pattern printing apparatus, and a method of manufacturing a liquid crystal display using the ink pattern printing apparatus.

2. Discussion of the Related Art

Electronic devices can be made lighter, smaller and of higher density using fine patterns such as, for example, micropatterns. In a liquid crystal display, micropatterns for forming components such as wires, filters and spacers can be made through a variety of pattern formation techniques.

In a liquid crystal display, spacers are interposed between two opposing substrates to maintain a cell gap between the two substrates. The spacers can be bead spacers and column spacers. A dispersing method can be used for forming the bead spacers, and a patterning method can be used for forming the column spacers. The dispersing method for forming bead spacers is simpler as compared to the patterning method for forming column spacers. However, beads dispersed at pixel regions of a liquid crystal display decrease an aperture ratio and cause light leakage. According to the patterning method, a decrease of the aperture ratio can be prevented since the column spacers can be accurately formed at desired positions. However, the patterning method involves a more complex photolithographic process. Further, micropatterns formed by photolithography can be overetched due to, for example, an etching solution or an etching gas.

An organic film comprising a photosensitive material can be used for the exposure and development processes. However, this method is not cost effective because only a small portion of the organic film coated on the entire surface of a substrate is used.

An alternative approach is a printing method using, for example, recesses having the same pattern as a spacer pattern formed in a printing plate, and spacer-containing ink filled in the recesses. Residual ink outside the recesses is removed using a blade, and the resultant ink pattern is transferred to a substrate. With the printing method, position adjustment can be performed more precisely and process costs are lower compared to the dispersing and the patterning methods. However, as the size of a substrate increases, the size of the blade also increases. With larger-sized blades, abrasion due to a physical contact between the substrate and the blade can occur during the removal of the residual ink, rendering the surface of the blade uneven. An uneven blade may not completely remove the residual ink on the printing plate, thereby causing inaccurate printing of an ink pattern.

SUMMARY OF THE INVENTION

Exemplary embodiments of the present invention include an ink pattern printing apparatus that is used to print accurate ink patterns on a large-size substrate.

According to an embodiment of the present invention, an ink pattern printing apparatus includes a lower frame including a printing plate having at least one recess, and an upper frame including an ink supply device supplying ink onto the printing plate for filling the at least one recess with the ink, a removing blade removing residual ink on an upper surface of the printing plate by releasing a pressurized gas through an exhaust port in the removing blade, and a transfer roller including a transfer sheet, wherein the transfer sheet receives transfer of ink from the at least one recess.

According to an embodiment of the present invention, a method of forming an ink pattern includes supplying ink onto a recess pattern formed on a printing plate, removing residual ink on an upper surface of the printing plate using a removing blade releasing a pressurized gas through an exhaust port in the removing blade, and printing an ink pattern filled in the recess pattern onto a substrate.

According to an embodiment of the present invention, a method of manufacturing a liquid crystal display includes forming a black matrix pattern and a color filter pattern on a substrate, supplying ink comprising a spacer and a curing agent onto a printing plate having a recess pattern of the same pattern as the black matrix pattern, removing residual ink on an upper surface of the printing plate using a removing blade releasing a pressurized gas through an exhaust port in the removing blade, and printing an ink pattern filled in the recess pattern onto the substrate so that the ink pattern corresponds to the black matrix pattern.

BRIEF DESCRIPTION OF THE DRAWINGS

Exemplary embodiments of the present invention can be understood in more detail from the following description taken in conjunction with the accompanying drawings in which.

DETAILED DESCRIPTION OF EXEMPLARY EMBODIMENTS

It will be understood that when an element or layer is referred to as being "on", "connected to" or "coupled to" another element, it can be directly on, connected or coupled to the other element or layer or intervening elements may be present. Spatially relative terms, such as "beneath," "below", "lower", "above", "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Exemplary embodiments of the present invention are more fully described below with reference to the accompanying drawings.

Throughout the specification, the term "ink" includes a flowable material that can be cured or fixed after the lapse of a predetermined time or by a subsequent treatment. The flowable material includes, e.g., metal, an organic material, an inorganic material or a polymer material-containing ink.

Figure 1:
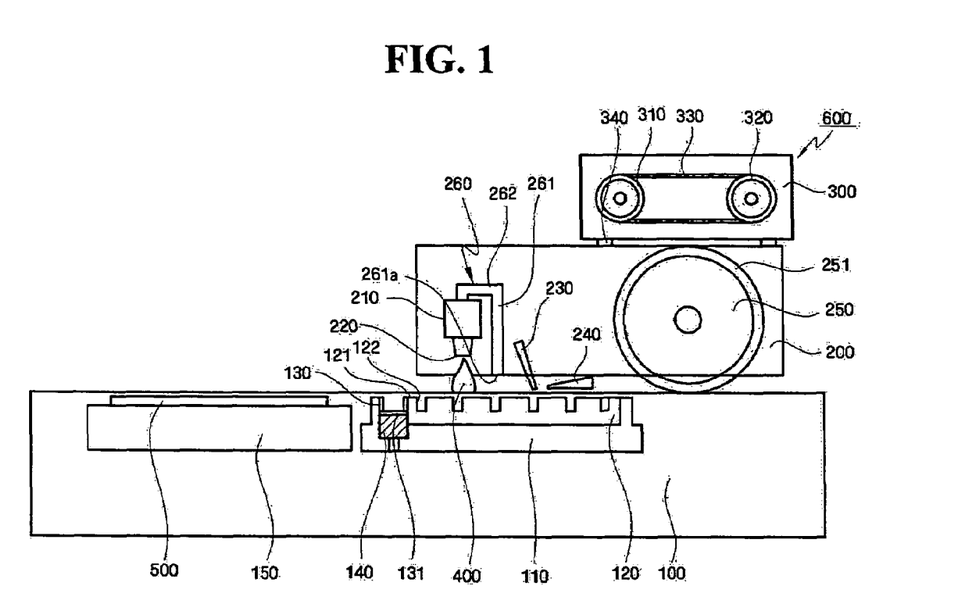
FIG. 1 is a schematic sectional view illustrating an ink pattern printing apparatus according to an embodiment of the present invention.

FIG. 1 is a schematic sectional view illustrating an ink pattern printing apparatus according to an embodiment of the present invention. Referring to FIG. 1, An ink pattern printing apparatus ("printing apparatus") 600 is used to form various ink patterns on a substrate 500. Ink 400 may be selected from various materials according to a desired pattern. For forming spacers, the ink 400 may be a mixed material comprising, for example, a bead spacer, a thermal curing agent or a UV curing agent. For forming a color filter, the ink 400 may be, for example, a photosensitive composition.

The printing apparatus 600 includes a lower frame 100, an upper frame 200 facing the lower frame 100 and moving reciprocally with respect to the lower frame 100, and a cleaning unit 300 formed on the upper frame 200.

The lower frame 100 can be fixedly formed on a ground and includes a printing plate support 110, a printing plate 120, a substrate support 150, and an ink collection tank 130.

The printing plate 120 is disposed at an upper part of the lower frame 100 and includes a plurality of recesses 122. The printing plate 120 may comprise, for example, glass, plastic, or metal. The recesses 122 may be formed by, for example, photolithography, molding, or laser processing. The recesses 122 have substantially the same patterns and depths as the ink pattern to be printed.

The printing plate support 110 is disposed under the printing plate 120 to fixedly support the printing plate 120. Since the pattern of the recesses 122 varies according to an ink pattern, the printing plate 120 should be chosen according to the ink pattern. The printing plate 120 is placed in the printing plate support 110. The printing plate support 110 may include detachable means (not shown) to receive or remove the printing plate 120.

The substrate support 150 is disposed parallel to the printing plate 120 at an upper part of the lower frame 100. The substrate 500 for forming an ink pattern thereon, e.g., a first substrate or a second substrate of a liquid crystal display, is placed on the substrate support 150. In an embodiment, an upper surface of the substrate 500 placed on the substrate support 150 may be at the same level as the upper surface of the lower frame 100. Thus, the lower frame 100 may have a cavity to a depth corresponding to the thickness of the substrate 500 from its upper surface to receive the substrate support 150. In an embodiment, the lower frame 100 may include a position adjuster (not shown) capable of adjusting the position of the substrate support 150 upwardly and downwardly according to the thickness of the substrate 500.

The ink collection tank 130 is disposed between the printing plate 120 and the substrate support 150. The ink collection tank 130 collects the ink 400 separated from the printing plate 120 by a removing blade 240. The ink 400 collected in the ink collection tank 130 can be recycled to an ink supply device 210. A bottom 131 of the ink collection tank 130 can be opened. An elevator 140 for lifting and lowering the ink collection tank 130 may be disposed under the ink collection tank 130.

The upper frame 200 faces the lower frame 100 and is disposed above the lower frame 100. The lower frame 100 can be fixedly disposed, such as to the floor, whereas the upper frame 200 can be disposed to move reciprocally along the upper surface of the lower frame 100 according to an embodiment of the present invention. The upper frame 200 is used for ink supply and printing, and includes the ink supply device 210, a filling blade 230, the removing blade 240, a transfer roller 250, and an ink recycling device 260.

The ink supply device 210 is used for ink storage and supply. In an embodiment, the ink 400 may be manually supplied to the ink supply device 210 via an ink inlet (not shown). Alternatively, the ink supply device 210 may be connected to an ink storage tank (not shown) and the ink 400 from the ink storage tank may be supplied to the ink supply device 210 via a pump (not shown). In another embodiment, the ink 400 may be supplied to the ink supply device 210 from the ink recycling device 260. The ink supply device 210 includes at least one ink outlet 220 to supply the ink 400 onto the printing plate 120. The ink supply device 210 may include an ink stirrer (not shown) for mixing ink components constituting the ink 400.

The filling blade 230 is disposed behind the ink supply device 210 with respect to the movement direction of the upper frame 200. When the upper frame 200 moves relative to the lower frame 100, the filling blade 230 pushes the ink 400 from the ink supply device 210 in the movement direction of the upper frame 200 to be filled in the recesses 122 of the printing plate 120. The movement direction of the upper frame 200, i.e., from right to left in FIG. 1, is referred to as a forward direction.

The filling blade 230 may be formed in the shape of, for example, a knife or wedge having a wide width. The filling blade 230 may be fixed to the upper frame 200 or moved upwardly and downwardly by a position adjuster (not shown). The filling blade 230 may include a rotary shaft (not shown) for rotating the end contacting with the ink 400 around a wedge-shaped bottom. Parameters such as distance or angle between the filling blade 230 and the printing plate 120 can be adjusted by the position adjuster and the rotary shaft.

The removing blade 240 is disposed behind the filling blade 230 with respect to the forward direction, and is used to remove residual ink on an upper surface 121 of the printing plate 120. The removing blade 240 may be formed in a wedge shape similar to the filling blade 230. The residual ink on the printing plate 120 can be separated from the upper surface 121 of the printing plate 120 by, for example, a pressurized gas from a wedge-shaped thin end (240a of FIG. 2) of the removing blade 240. The removing blade 240 moves the residual ink in the forward direction. The residual ink can be collected in the ink collection tank 130 disposed between the printing plate 120 and the substrate support 150.

Figure 2:
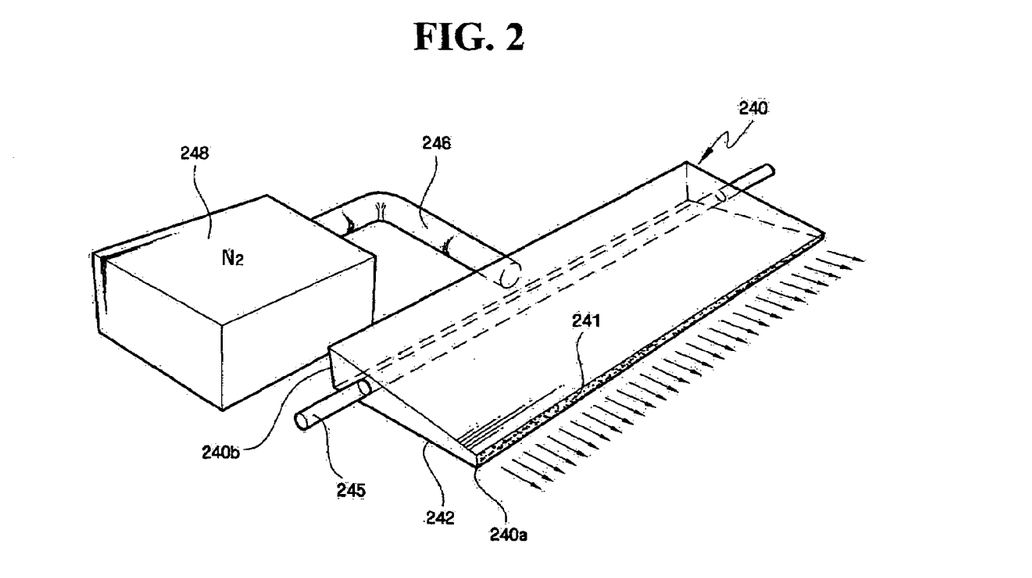
FIG. 2 is a schematic perspective view illustrating a removing blade of an ink pattern printing apparatus according to an embodiment of the present invention.

FIG. 2 is a schematic perspective view illustrating the removing blade 240 of an ink pattern printing apparatus according to an embodiment of the present invention. Referring to FIG. 2, the removing blade 240 includes an exhaust port 241 at the thin end 240a. A gas storage tank 248 connected to a gas supply line 246 is disposed at a thick end 240b of the removing blade 240.

In an embodiment, the gas storage tank 248 can be filled with an inert gas such as, for example, nitrogen or air. The gas filled in the gas storage tank 248 is supplied to the removing blade 240 via the gas supply line 246. The exhaust port 241 disposed at the thin end 240a of the removing blade 240 includes exhaust holes or lines. At least one of the gas storage tank 248, the gas supply line 246, and the removing blade 240 includes a pressure device (not shown) for pressurizing the gas. A rotary shaft 245 may be provided near the thick end 240b of the removing blade 246 connected to the gas supply line 246. The removing blade 240 can be rotated at a predetermined angle with respect to the rotary shaft 245 to effectively clean a transfer sheet (251 of FIG. 1).

In an embodiment, the spray direction of the removing blade 240 may be substantially parallel to the printing plate 120 to not affect the ink 400 filled in the recesses 122. The removing blade 240 may move while maintaining a predetermined gap from the upper surface 121 of the printing plate 120 according to an embodiment of the present invention.

Figure 3A:
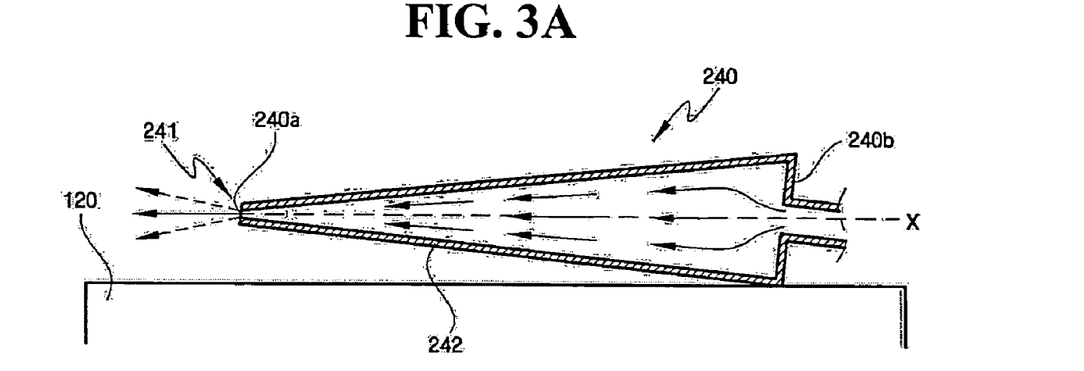
FIGS. 3A and 3B are sectional views illustrating spray directions of a removing blade of an ink pattern printing apparatus according to an embodiment of the present invention.
Figure 3B:
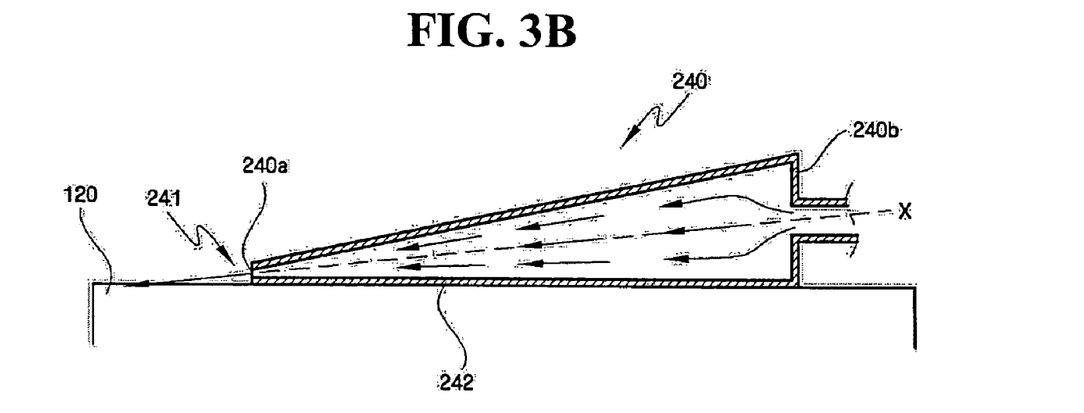

Sectional views illustrating the spray direction of the removing blade 240 according to an embodiment of the present invention are shown in FIGS. 3A and 3B. In FIGS. 3A and 3B, arrows indicated by solid lines and dashed lines denote directions of gas flows.

Referring to FIG. 3A, a central axis X of the removing blade 240 is parallel to the printing plate 120, and a portion of a bottom 242 of the thick end 240b of the removing blade 240 contacts the printing plate 120. A pressurized gas moves along the internal portion of the removing blade 240 and is then released from the exhaust port 241 of the removing blade 240 in the direction of the central axis X. That is, the pressurized gas is released substantially parallel to the printing plate 120 within the interior angle of the thin end 240a of the removing blade 240. In this embodiment, an angle formed between the dashed-line arrow and the central axis X is made small to not affect the ink 400 filled in the recesses 122. In an embodiment of the present invention, the angle formed between the dashed-line arrow and the central axis can be in a range of about 5 degrees to about 30 degrees.

Referring to FIG. 3B, the bottom 242 of the removing blade 240 contacts parallel to the printing plate 120. In this embodiment, the spray direction of the removing blade 240 is inclined with respect to the printing plate 120 since the spray direction is substantially the same as the central axis X of the removing blade 240. In this embodiment, to reduce an influence of the gas on the ink 400 filled in the recesses 122, a spray pressure can be adjusted.

Figure 4:
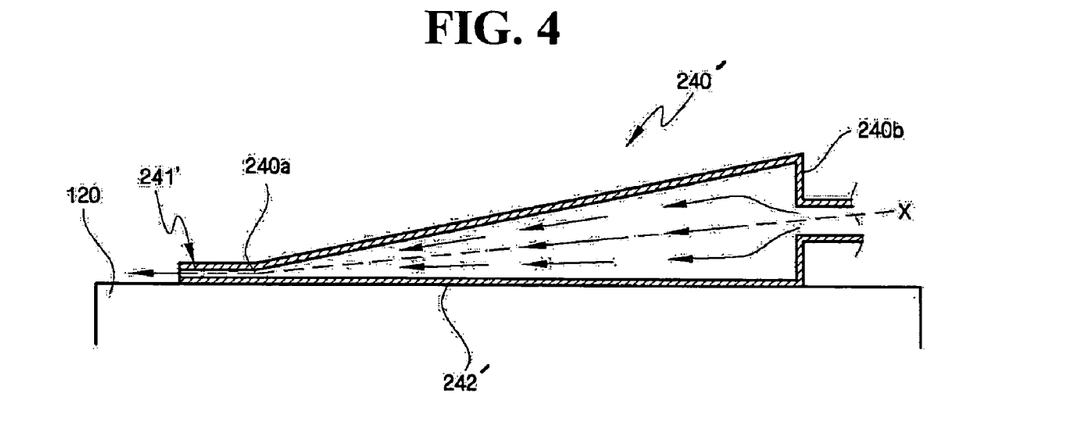
FIG. 4 is a sectional view illustrating a spray direction of a removing blade according to an embodiment of the present invention.

FIG. 4 is a sectional view illustrating a removing blade 240' according to another embodiment of the present invention. Referring to FIG. 4, an exhaust port 241' of the removing blade 240' extends parallel to a bottom 242' of the removing blade 240'. Thus, when the bottom 242' of the removing blade 240' is positioned parallel to the printing plate 120, a pressurized gas is directed to the exhaust port 241' along the internal shape of the removing blade 240' and moves parallel to the printing plate 120 in the exhaust port 241'. Therefore, residual ink on the printing plate 120 can be removed using a sufficiently pressurized gas without affecting ink 400 filled in recesses 122.

Referring to FIG. 1, the transfer roller 250 transferring the ink 400 filled in the recesses 122 to the substrate 500 is disposed behind the ink supply device 210, the filling blade 230, and the removing blade 240 in the first direction. The transfer roller 250 may be disposed close to a turning radius of the removing blade 240. A transfer sheet 251 is attached to a surface of the transfer roller 250. The transfer sheet 251 may be, for example, a silicone material with good hydrophilicity.

The ink recycling device 260 recycles the ink 400 collected in the ink collection tank 130. The ink recycling device 260 may be coupled to the ink supply device 210. According to an embodiment of the present invention, the ink recycling device 260 is disposed between the ink supply device 210 and the filling blade 230. In another embodiment, the ink recycling device 260 may be disposed between the filling blade 230 and the removing blade 240 or behind the removing blade 240 in the first direction. The ink recycling device 260 includes a vertical transport tube 261 and a bottom 261a of the vertical transport tube 261. In an embodiment, the bottom 261a of the vertical transport tube 261 is opened to receive the ink collection tank 130. The vertical transport tube 261 is used as a channel for transporting the ink collection tank 130. The vertical transport tube 261 is connected to the overlying horizontal transport tube 262. The horizontal transport tube 262 may include a horizontal transport unit such as, for example, a conveyor belt or an auto-push. The horizontal transport tube 262 can be spatially connected to the ink supply device 210.

The cleaning unit 300 is connected to an upper portion of the upper frame 200. The cleaning unit 300 includes first and second rotary rollers 310 and 320, and a cleaning cloth 330 wrapping the first and second rotary rollers 310 and 320. The cleaning cloth 330 may be, for example, a fiber such as cotton or non-woven fabric, or other synthetic resin to remove residual ink on the transfer sheet 251. In an embodiment, the cleaning cloth 330 may be configured such that the cleaning cloth 330 wraps the first rotary roller 310 while extending over the second rotary roller 320 in a longitudinal direction. In such a manner, the cleaning cloth 330 supplied from one side of the second rotary roller 320 contacts the transfer sheet 251 to clean the transfer sheet 251. In an embodiment, the cleaning unit 300 may include a conveyor belt (not shown) on which the first and second rotary rollers 310 and 320 are placed. The conveyor belt may rotate attaching the cleaning cloth 330 to an outer surface of the conveyor belt.

During a printing process, the cleaning unit 300 is separated from the transfer roller 250 and the transfer sheet 251. During a cleaning process, the cleaning unit 300 moves toward the upper frame 200 to contact with the transfer sheet 251 of the transfer roller 250. A position adjuster (not shown) for adjusting the position of the cleaning unit 300 may be disposed at a connector 340 between the upper frame 200 and the cleaning unit 300.

Figure 5:
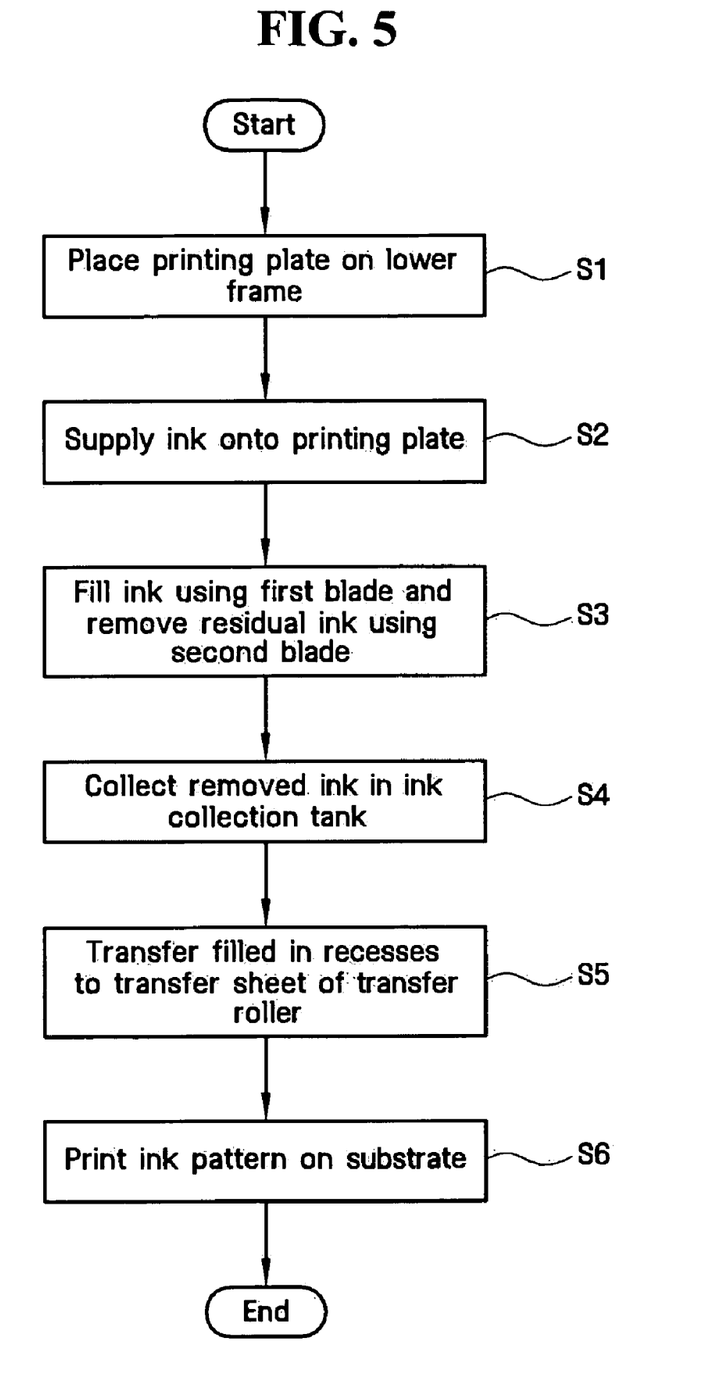
FIG. 5 is a flowchart illustrating a method of forming an ink pattern according to an embodiment of the present invention.

A method of forming an ink pattern using the above-described printing apparatus according to an embodiment of the present invention is described with reference to FIGS. 5 through 15. FIG. 5 is a flowchart illustrating a method of forming an ink pattern according to an embodiment of the present invention. FIGS. 6 through 15 are sequential sectional views illustrating a method of forming an ink pattern according to an embodiment of the present invention.

Figure 6:
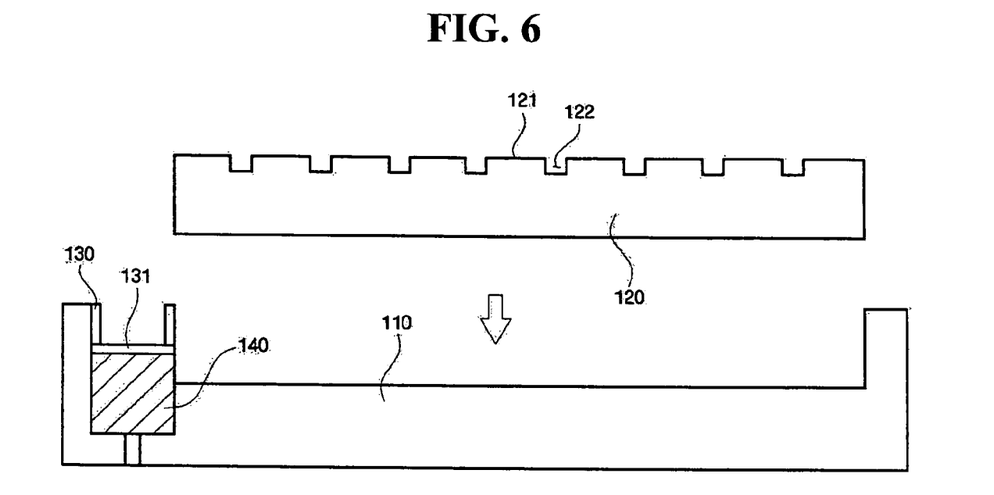
FIGS. 6 through 15 are sectional views illustrating a method of forming an ink pattern according to an embodiment of the present invention.

Referring to FIGS. 1, 5 and 6, a printing plate 120 with recesses 122 having the same pattern as a desired pattern is placed in a printing plate support 110 of a lower frame 100 (operation S1).

Figure 7:
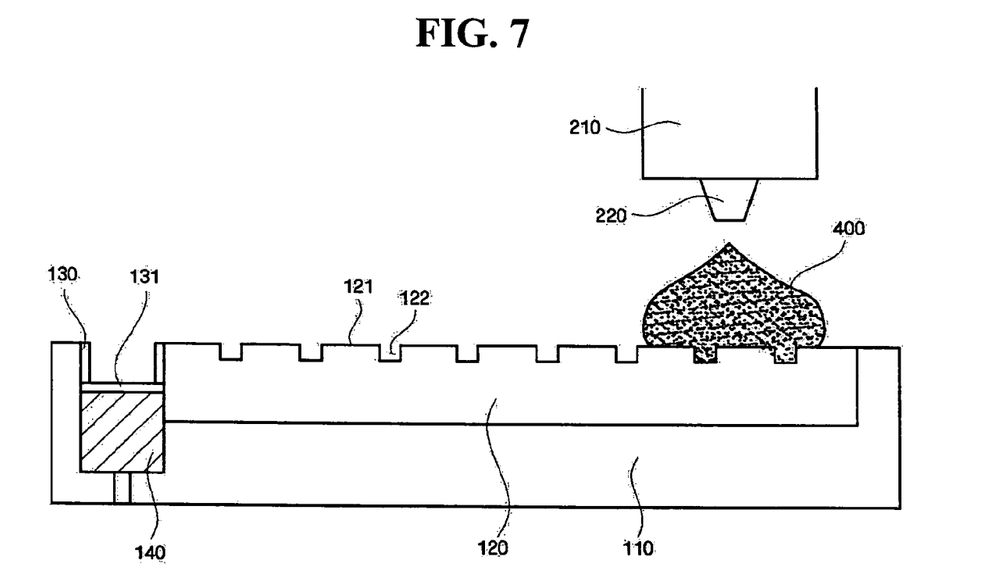

Referring to FIGS. 1, 5 and 7, an upper frame 200 is disposed on the lower frame 100. Then, the upper frame moves in the forward direction so that an ink supply device 210 is aligned with first few recesses 122 of the printing plate 120. Then, ink 400 is supplied onto the printing plate 120 from the outlet 220 of the ink supply device 210 (operation S2). In an embodiment, dropwise-adding or dispersing can be used considering parameters such as, for example, the viscosity and supply amount of the ink 400, or the depth of the recesses 122. When the ink 400 is supplied on the printing plate 120 using a dispersing method, a nozzle can be used as the outlet 220.

Referring to FIGS. 1, 2, 5 and 8, the upper frame 200 moves in the forward direction so that the filling blade 230 contacts the ink 400 supplied onto the printing plate 120. The upper frame 200 continues to move in the forward direction while the filling blade 230 contacts the ink 400. During the movement of the upper frame 200, the filling blade 230 may directly contact the printing plate 120 or be separated from the printing plate 120 by a predetermined distance. When the upper frame 200 moves in the forward direction while the filling blade 230 contacts the printing plate 120, the filling blade 230 is used to primarily remove residual ink on the upper surface 121 of the printing plate 120. When the upper frame 200 moves in the forward direction while the filling blade 230 directly contacts the printing plate 120, the ink 400 on the printing plate 120 is pushed in the forward direction and fills the recesses 122 (operation S3).

Figure 8:
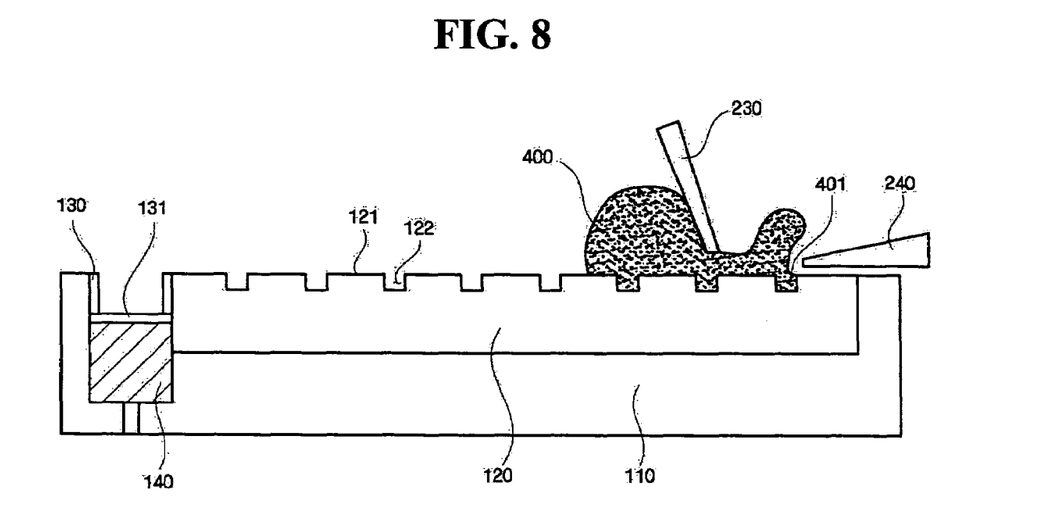

The removing blade 240, which is disposed behind the filling blade 230 with respect to the forward direction and connected to the gas supply tank 248, moves in the same direction as the movement direction of the filling blade 230 while the removing blade 240 is separated from the filling blade 230 by a predetermined distance. The removing blade 240 releases a pressurized gas, which is pressurized by a pressure device, from an exhaust port 241 from the thin end 240a. The released gas separates residual ink from the upper surface 121 of the printing plate 120 and moves the separated ink in the forward direction. After the removing blade 240 moves along the printing plate 120, no ink is left on the upper surface 121 of the printing plate 120 except the recesses 122 (secondary removal) (operation S3). Since the residual ink is removed by the pressurized gas, no damage to the substrate 500 or the removing blade 240 is caused.

Figure 9:
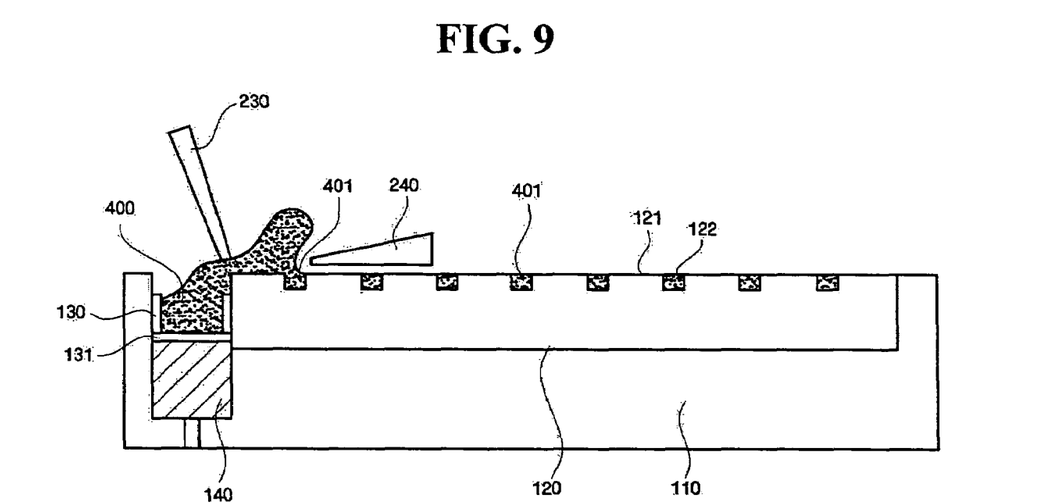

Referring to FIGS. 1, 5 and 9, while the upper frame 200 moves in the forward direction, the ink filling by the filling blade 230 and the ink removal by the removing blade 240 are continuously conducted. The ink 400 which is not filled into the recesses 122 is pushed in the forward direction and collected in the ink collection tank 130 disposed between the printing plate 120 and a substrate support 150 (operation S4).

Figure 10:
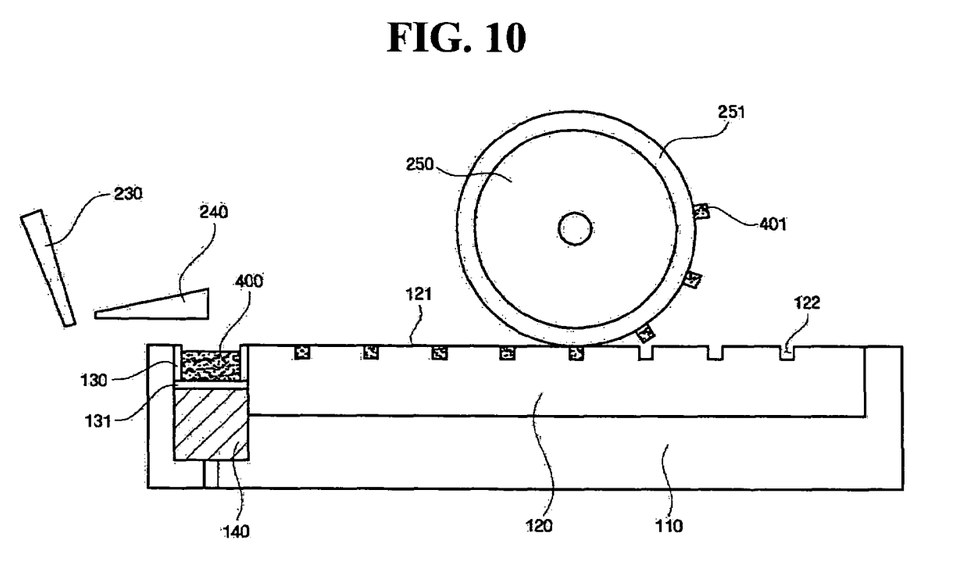

Referring to FIGS. 5 and 10, the upper frame 200 continues to move in the forward direction. The transfer roller 250 disposed behind the removing blade 240 with respect to the forward direction moves along the printing plate 120, and ink 401 filled in the recesses 122 of the printing plate 120 are attached to the transfer sheet 251 of the transfer roller 250. In an embodiment, the outer circumference of the transfer roller 250 may be equal to or greater than the width of the printing plate 120 with the pattern of the recesses 122, and the transfer sheet 251 may comprise a material having good adhesion to the ink 401. The ink 401 filled in the recesses 122 are transferred to the transfer sheet 251 while maintaining a predetermined gap from each other (operation S5).

Figure 11:
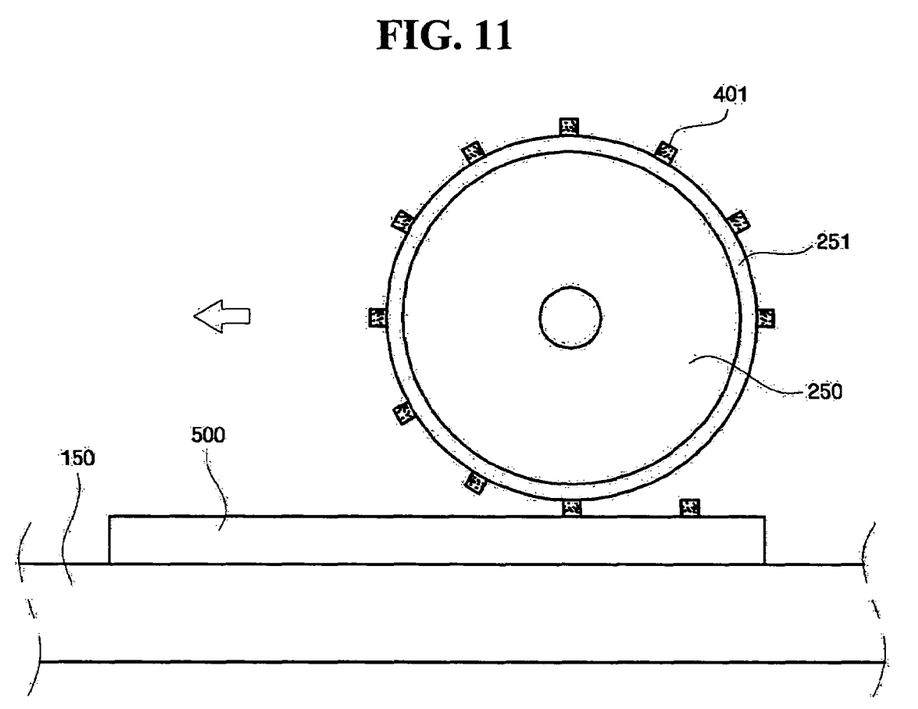

Referring to FIGS. 5 and 11, the substrate 500, such as a first or second substrate of a liquid crystal display, is disposed on the substrate support 150 of the lower frame 100. The upper frame 200 moves further in the forward direction so that the transfer roller 250 moves on an upper surface of the substrate 500. The ink 401 attached to the transfer sheet 251 of the transfer roller 250 are printed to the substrate 500, thereby forming a pattern of the ink 401 on the substrate 500 (operation S6).

Figure 12:
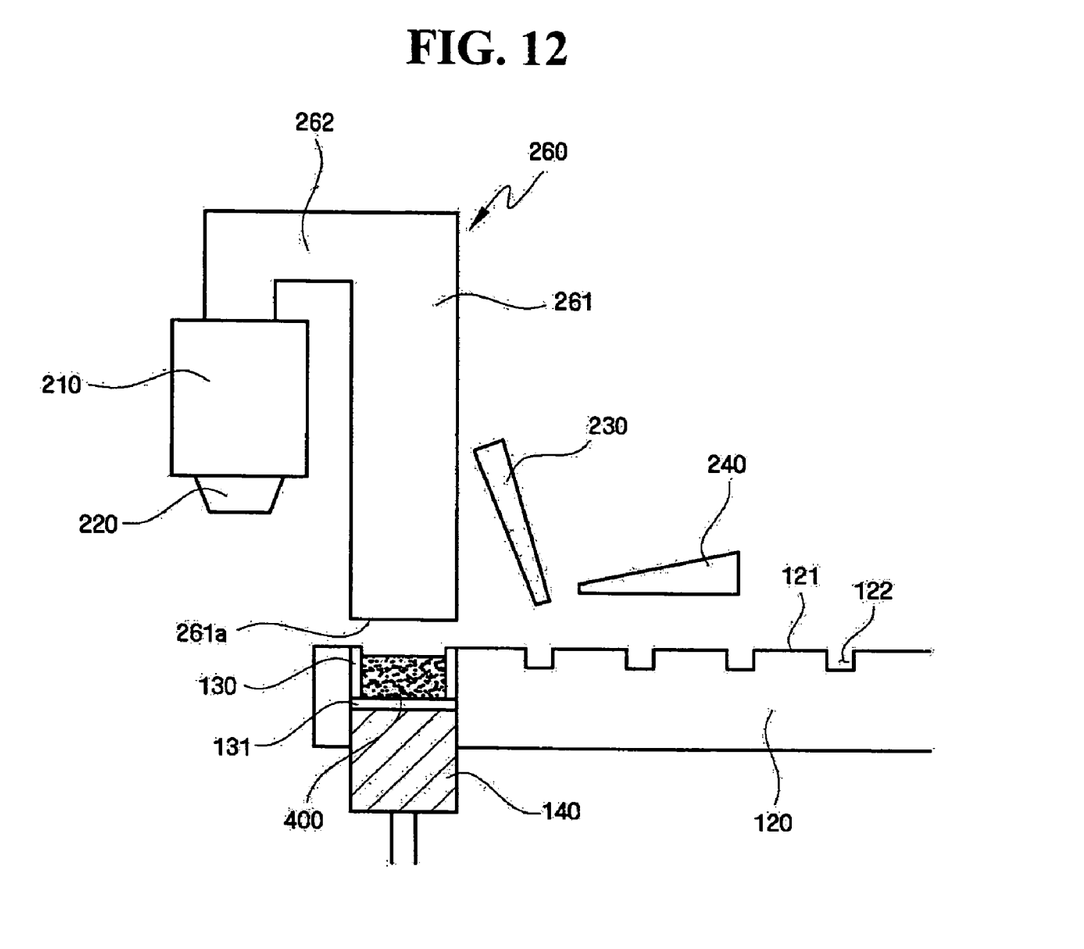
Figure 13:
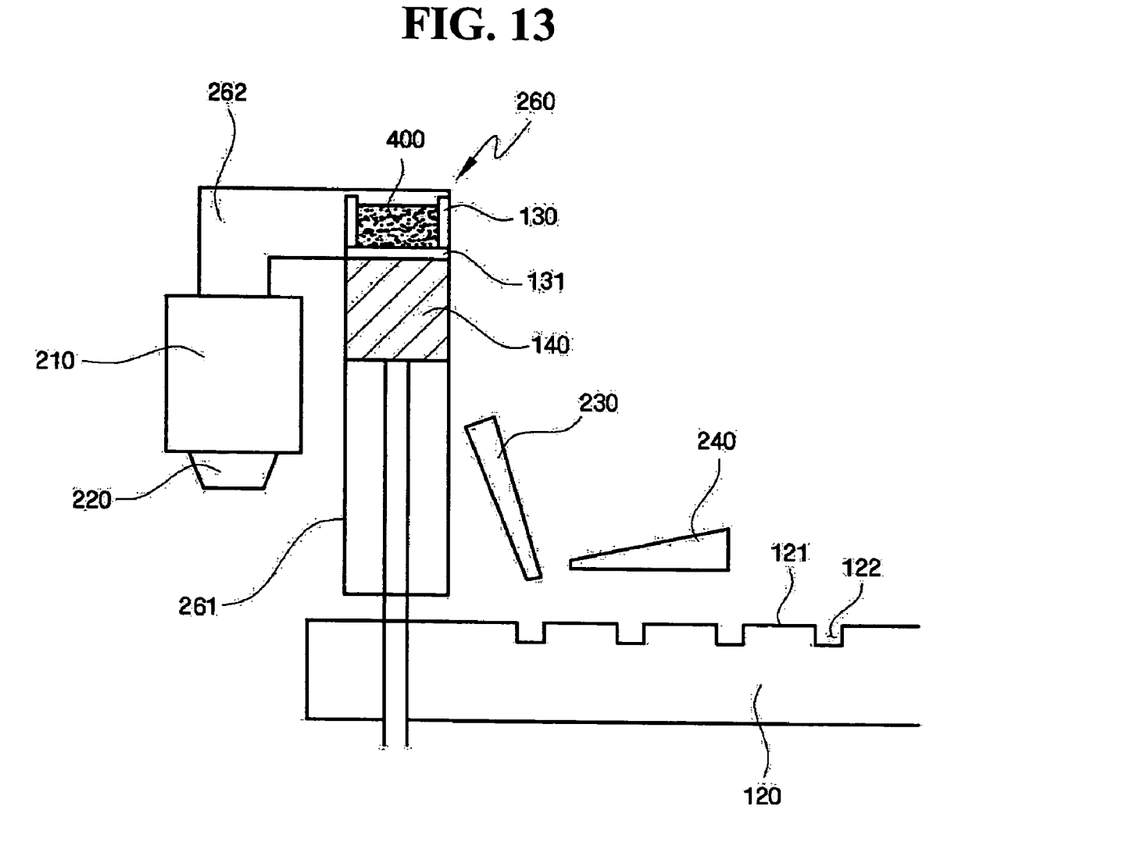
Figure 14:
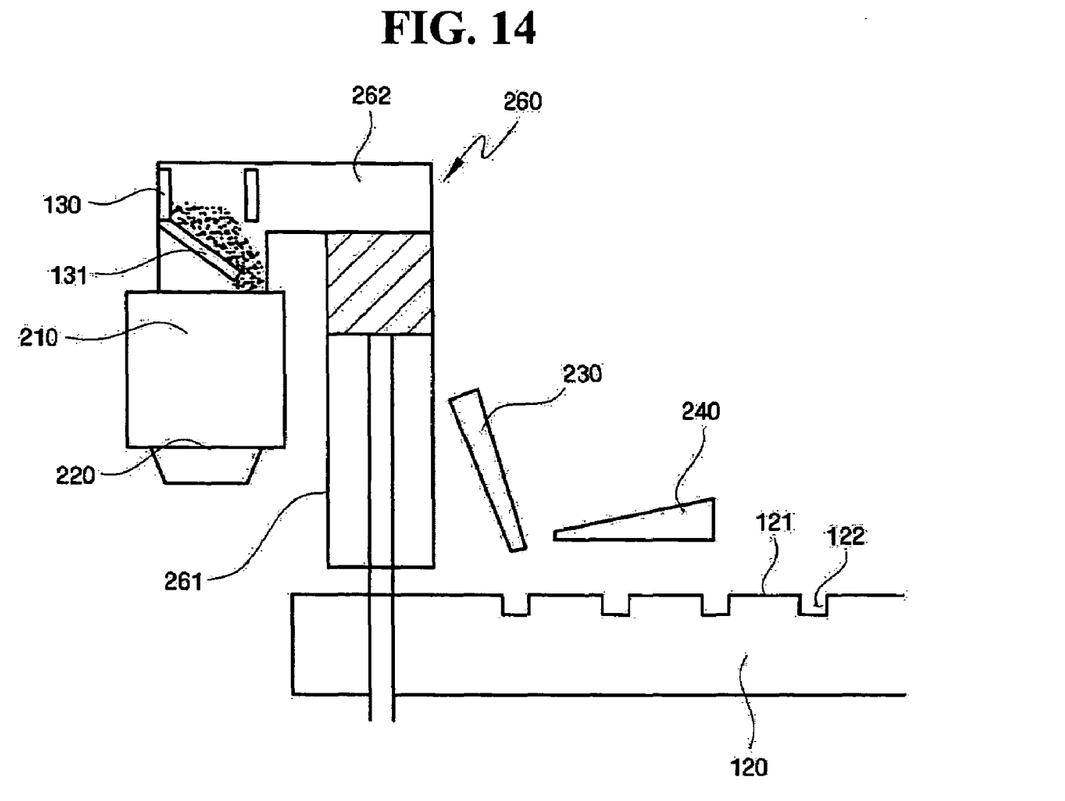

FIGS. 12 through 14 illustrate a method of recycling ink collected in the ink collection tank 130 according to an embodiment of the present invention. The ink recycling may be performed after collecting the ink or forming the ink pattern.

Referring to FIGS. 1 and 12, an upper frame 200 moves in the backward direction so that the vertical transport tube 261 of the ink recycling device 260 is disposed above the ink collection tank 130 of the lower frame 100. The bottom 261a of the vertical transport tube 261 is opened in this embodiment to receive the ink collection tank 130.

Referring to FIG. 13, the ink collection tank 130 is lifted to the horizontal transport tube 262 along the vertical transport tube 261 using the elevator 140 disposed below the ink collection tank 130. Then, the ink collection tank 130 moves to the ink supply device 210 using a horizontal transport unit (not shown) such as, for example, a conveyer belt disposed on the horizontal transport tube 262 or an auto-push disposed outside the horizontal transport tube 262.

Referring to FIG. 14, a bottom 131 of the ink collection tank 130 is opened to pour the ink 400 into the ink supply device 210. Therefore, the ink 400 collected in the ink collection tank 130 can be recycled. After then, the ink collection tank 130 is restored to its original position.

Figure 15:
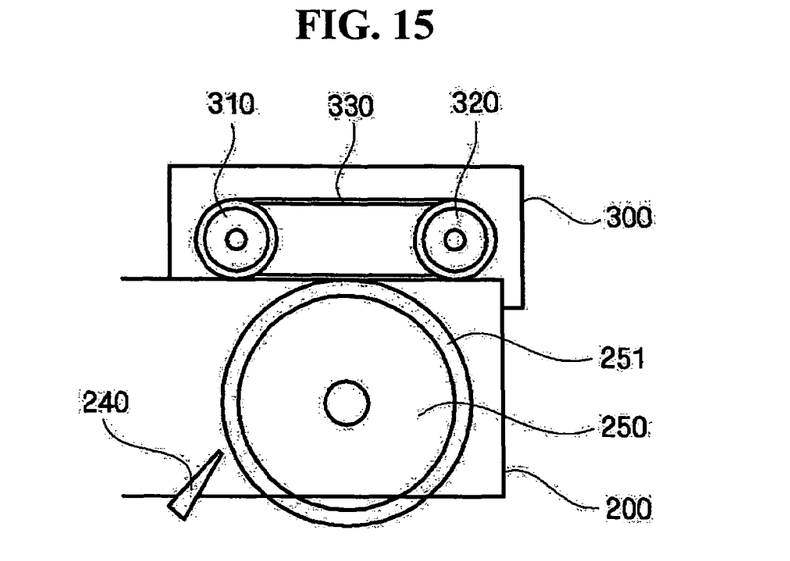

FIG. 15 illustrates a method of cleaning a transfer sheet of a transfer roller according to an embodiment of the present invention. Referring to FIGS. 2 and 15, to remove residual ink on the transfer sheet 251 after transferring the ink patterns using the transfer roller 250, the cleaning unit 300 disposed above the upper frame 200 moves downwardly so that the cleaning cloth 330 of the cleaning unit 300 contacts the transfer sheet 251. Then, the transfer roller 250 rotates as the upper frame 200 moves. The first and second rotary rollers 310 and 320 of the cleaning unit 300 rotate using the cleaning cloth 330, and the transfer sheet 251 is rubbed by the cleaning cloth 330.

The removing blade 240 rotates at a predetermined angle around the rotary shaft 245 to be disposed close to the transfer sheet 251. The removing blade 240 releases a pressurized gas onto the transfer sheet 251. Then, the residual ink on the transfer sheet 251 can be removed from the transfer sheet 251 or may be loosely attached on the transfer sheet 251 due to the pressurized gas. Thus, the residual ink on the transfer sheet 251 can be removed by the cleaning cloth 330. According to an embodiment of the present invention, the transfer sheet 251 can be cleaned by the removing blade 240 releasing a pressurized gas without separately using an air knife cleaning system, thereby simplifying the configuration of a manufacturing apparatus and reducing manufacturing costs.

The printing apparatus and a method of forming an ink pattern according to an embodiment of the present invention can be applied to various technical fields. In an embodiment, the substrate may be, for example, a first substrate including a thin film transistor array for a liquid crystal display, a second substrate facing the first substrate, a thin film transistor substrate for an organic electroluminescent (EL) device, a semiconductor or insulating substrate for other display devices or semiconductor devices. Examples of an ink pattern to be printed include metal wire patterns, insulating film patterns, and spacers of flat panel displays such as, for example, liquid crystal displays.

A liquid crystal display including spacers formed using an ink pattern printing apparatus according to an embodiment of the present invention and a method of manufacturing a liquid crystal display using an ink pattern printing apparatus according to an embodiment of the present invention is illustrated in connection with FIGS. 16-20.

Figure 16:
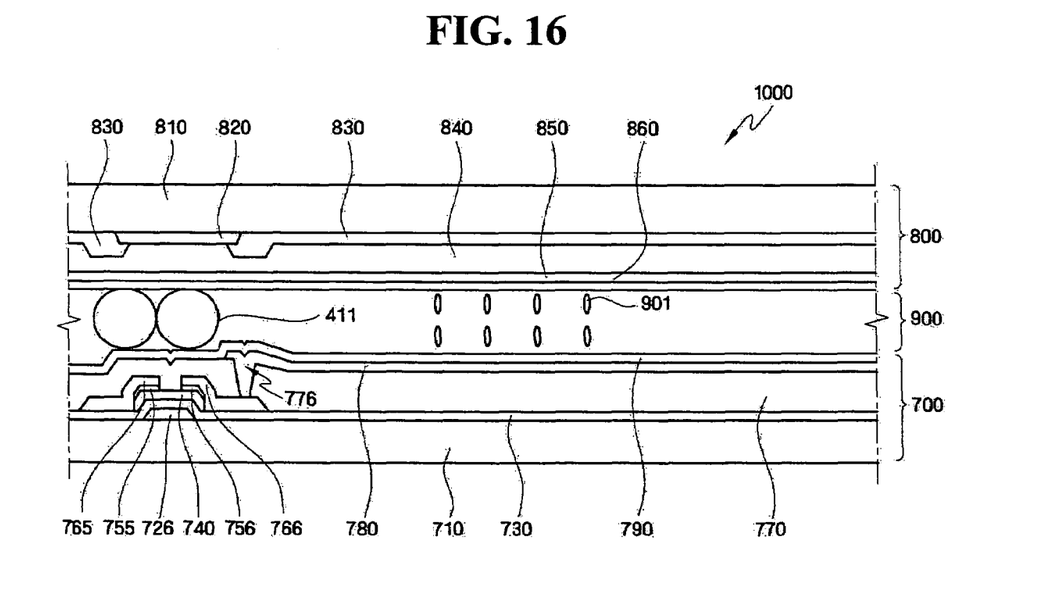
FIG. 16 is a sectional view illustrating a liquid crystal display using a method for forming an ink pattern according to an embodiment of the present invention.

FIG. 16 is a sectional view of a liquid crystal display manufactured according to an embodiment of the present invention. Referring to FIG. 16, a liquid crystal display 1000 includes a liquid crystal layer 900 interposed between a first substrate 700 and a second substrate 800.

The first substrate 700 includes gate lines, a gate electrode 726, a first insulating substrate 710 and a gate insulating film 730. The gate lines are used for gate signal transmission and extended in a first direction. The gate electrode 726 is connected to each of the gate lines and is disposed on the first insulating substrate 710. The gate insulating film 730 is disposed on the entire surface of the resultant structure.

The first substrate 700 further includes a semiconductor layer 740 and ohmic contact layers 755 and 756. The semiconductor layer 740 is disposed on a portion of the gate insulating film 730 overlapping with the gate electrode 726. The ohmic contact layers 755 and 756 are disposed on the semiconductor layer 740 so that a portion of the semiconductor layer 740 is exposed.

The first substrate includes data lines (not shown), a source electrode 765 and a drain electrode 766. The data lines transmit data signals and extend in a second direction to define pixels at their intersections with the gate lines. The source electrode 765 is connected to each of the data lines, and the drain electrode 766 is separated from the source electrode 765 by a predetermined distance. The source electrode 765 and the drain electrode 766 are disposed on the gate insulating film 730 on which the semiconductor layer 740 and the ohmic contact layers 755 and 756 are disposed. Portions of the source electrode 765 and the drain electrode 766 overlapping with the semiconductor layer 740 are formed in the same pattern as the underlying ohmic contact layers 755 and 756 so that a portion of the semiconductor layer 740 is exposed. The source electrode 765 and the drain electrode 766, together with the gate electrode 726 and the semiconductor layer 740, form a thin film transistor.

The first substrate further includes a passivation film 770, a contact hole 776, a pixel electrode 780, a common electrode 850 and an alignment film 790. The data lines are covered with the passivation film 770. The pixel electrode 780 is disposed at each pixel on the passivation film 770. The pixel electrode 780 is electrically connected to the drain electrode 766 via the contact hole 776. The pixel electrode 780, together with a common electrode 850 of the second substrate 800, forms an electric field. The alignment film 790 is disposed on the pixel electrode 780.

The second substrate 800 includes a black matrix pattern 820 and a second insulating substrate 810. The black matrix pattern 820 is disposed on the second insulating substrate 810. The black matrix pattern 820 substantially defines a pixel region, and comprises an opaque material such as, for example, chromium (Cr).

The second substrate further includes a color filter 830, an overcoat film 840 and an alignment film 860. The color filter 830 comprising red, green, and blue components is disposed below the black matrix pattern 820. The overcoat film 840 is disposed on the entire bottom surface of the second insulating substrate 810 having the color filter 830 to make the color filter 830 flat. The common electrode 850 is disposed below the overcoat film 840. The common electrode 850, together with the pixel electrode 780 of the first substrate 700, forms an electric field across the liquid crystal layer 900. The alignment film 860 is disposed below the common electrode 850.

Liquid crystal molecules 901 are inserted between the first substrate 700 and the second substrate 800 to form the liquid crystal layer 900.

The black matrix pattern 820 of the second substrate 800 may be overlapped with the gate lines and/or the data lines of the first substrate 700 to reduce its influence on an aperture ratio. In an embodiment, the black matrix pattern 820 may be overlapped with the thin film transistor. Spacers 411 are disposed between the black matrix pattern 820 of the second substrate 800 and the thin film transistor of the first substrate 700 to maintain a cell gap.

FIGS. 17 through 20 are sequential sectional views illustrating a method of manufacturing a liquid crystal display according to an embodiment of the present invention.

Figure 17:
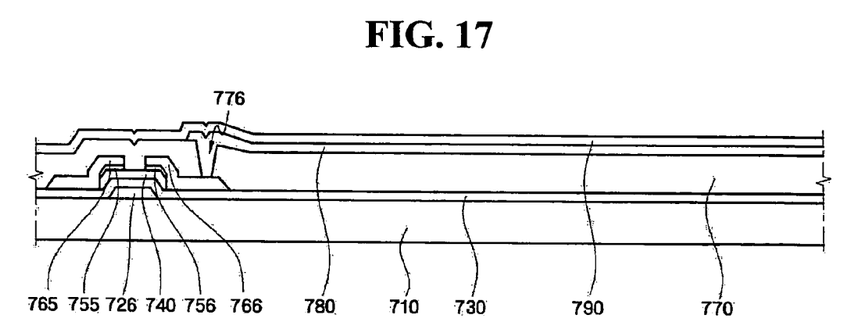
FIGS. 17 through 20 are sectional views illustrating a method of manufacturing a liquid crystal display according to an embodiment of the present invention.

Referring to FIG. 17, a conductive material is deposited on the first insulating substrate 710 and patterned to form gate lines (not shown) and a gate electrode 726. In an embodiment, silicon nitride is deposited on the resultant structure to form the gate insulating film 730. Then, hydrogenated amorphous silicon and n+ hydrogenated amorphous silicon highly doped with n-type impurity are sequentially deposited and patterned to form the semiconductor layer 740 and ohmic contact layers 755 and 756. Then, a conductive material is deposited and patterned to form the data lines (not shown), the source electrode 765, and the drain electrode 766. Then, an insulating material such as, for example, silicon nitride can be deposited and patterned to form the passivation film 770 having the contact hole 776. Then, ITO or IZO is deposited on the passivation film 770 and patterned to form the pixel electrode 780 electrically connected to the drain electrode 766. Then, a material such as, for example, polyimide can be coated on the resultant structure to form the alignment film 790.

Figure 18:
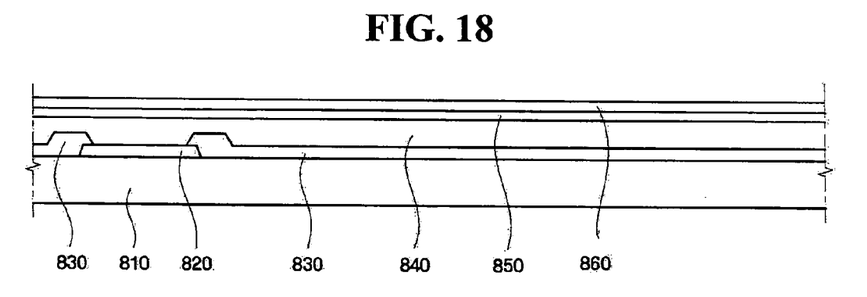

Referring to FIG. 18, an opaque material such as, for example, chromium (Cr) is deposited on the second insulating substrate 810 and patterned to form the black matrix pattern 820. Then, red photoresist is coated, followed by an exposure and development, to form a red component. Green and blue components are formed in the same manner as the red component. This completes a color filter 830 comprising the red, green, and blue components. Then, an organic material and ITO or IZO are sequentially deposited on the entire surface of the second insulating substrate 810 having the color filter 830 thereon to form the overcoat layer 840 and the common electrode 850. Then, a material such as, for example, polyimide is coated on the resultant structure to form the alignment film 860.

Figure 19:
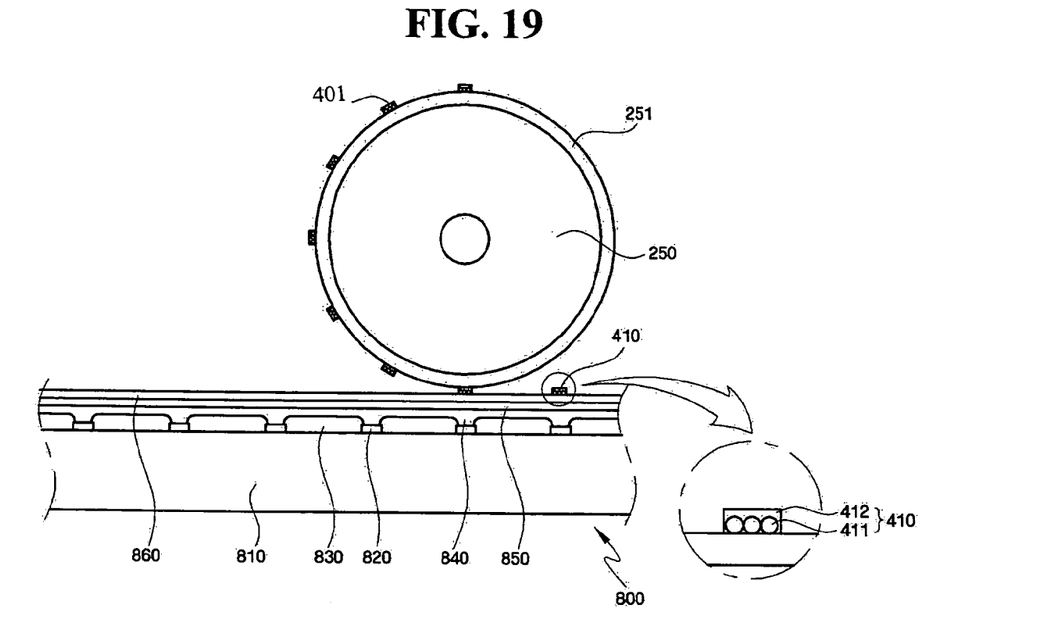

Referring to FIGS. 1 and 19, the second substrate 800 is placed in the substrate support 150 of the printing apparatus 600. Then, an ink pattern 410 is formed on the second substrate 800 in the same manner as described with reference to FIGS. 5 through 11. The ink pattern 410 is printed to correspond to the black matrix pattern 820 of the second substrate 800.

The ink used for forming the ink pattern 410 includes a spacer 411 and a curing agent 412. The spacer 411 includes an organic material having a low dielectric constant such as, for example, an acrylic organic compound capable of forming a polymer, Teflon, Benzocyclobutene (BCB), cytop, or Perfluorocyclobutene (PFCB). The curing agent 412 may be a thermal curing agent or a UV curing agent. A mixture ratio of the spacer 411 to the curing agent 412 in the ink may be about 30:70 to about 70:30. In an embodiment, the ink can be stirred with an ink stirrer of an ink supply device 210 so that the spacer 411 and the curing agent 412 are uniformly distributed in the ink. In an embodiment, the size of the spacer 411 may be the same as a cell gap between the first substrate 700 and the second substrate 800. In an embodiment, three to eight spacers may be contained in a single ink pattern.

Figure 20:
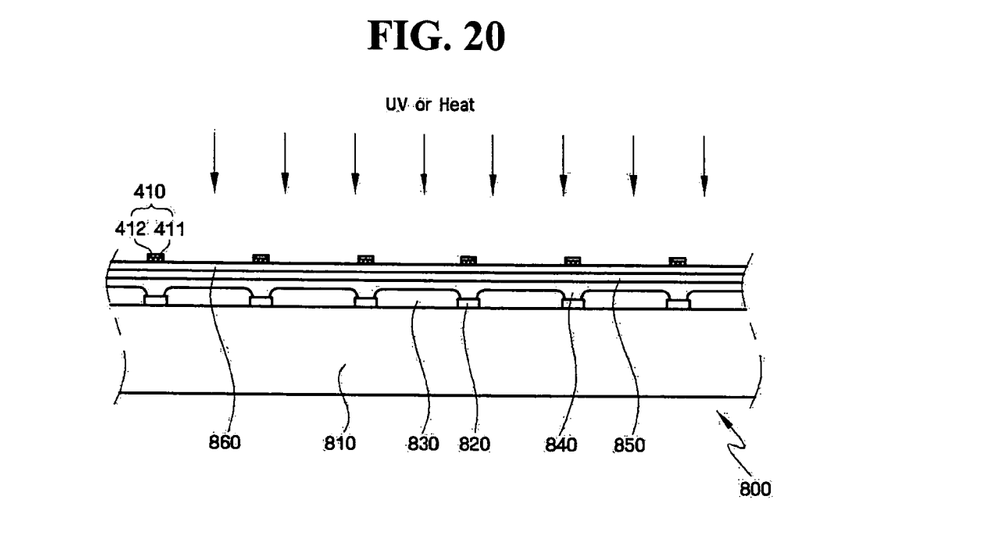

Referring to FIG. 20, the second substrate 800 having the ink pattern 410 thereon is exposed to heat or UV to cure the curing agent 412. Therefore, the ink pattern 410 including the spacer 411 is firmly attached to the second substrate 800.

Referring to FIG. 16, the first substrate 700 and the second substrate 800 are aligned with each other and coupled by a pressing. Then, the liquid crystal molecules 901 are inserted between the first substrate 700 and the second substrate 800 to form the liquid crystal layer 900. The liquid crystal display 1000 further includes polarization plates, a backlight, and compensation plates.

According to an embodiment of the present invention, a liquid crystal layer is inserted between previously prepared first and second substrates. According to another embodiment of the present invention, a second substrate may be prepared prior to or simultaneously with a first substrate. According to another embodiment of the present invention, after liquid crystal molecules are dropwise added to a previously prepared first or second substrate to form a liquid crystal layer, the other substrate may be prepared and then coupled to the previously prepared substrate.

According to an embodiment of the present invention, spacers are formed on a second substrate. According to another embodiment of the present invention, spacers may also be formed on a first substrate. In this embodiment, the spacers are disposed on a thin film transistor, gate lines, or data lines. According to an embodiment of the present invention, with respect to the first substrate, a semiconductor layer and data lines can be patterned using a single mask.

According to an embodiment of the present invention, a color filter and a common electrode are formed on a first substrate. According to another embodiment of the present invention, the color filter and/or the common electrode can be formed on the first substrate.

According to an embodiment of the present invention, transmissive, a semi-transmissive or reflective LCD can be used.

The first substrate and a method of manufacturing the first substrate according to an embodiment of the present invention can be applied to a top gate-type organic EL display, or a TFT-type LCD.

The first substrate according to an embodiment of the present invention and the fabrication method thereof are also applicable to a bottom gate-type LCD wherein the gate electrode is disposed under the channel region of the semiconductor layer. According to another embodiment of the present invention, the first substrate and the fabrication method thereof can also be applied to top gate-type LCD.

According to an embodiment of the present invention, accurate ink patterns can be attained using a blade releasing a pressurized gas without damaging the blade or a substrate.

Since the blade releasing the pressurized gas is used in cleaning a transfer roller, the structure of the printing apparatus can be simplified. In addition, residual ink that is not used to form an ink pattern can be recycled, thereby reducing manufacturing costs.

Although the exemplary embodiments of the present invention have been described with reference to the accompanying drawings, it is to be understood that the present invention should not be limited to these precise embodiments but various changes and modification can be made by one ordinary skill in the art without departing from the spirit and scope of the present invention. All such changes and modification are intended to be included with the scope of the invention as defined by the appended claims.

What is claimed is:

1. An ink pattern printing apparatus, comprising:
   a lower frame comprising a printing plate having at least one recess; and
   an upper frame comprising:
      an ink supply device that supplies ink onto the printing plate for filling the at least one recess with the ink;
      a removing blade that removes residual ink on an upper surface of the printing plate by releasing a pressurized gas through an exhaust port in the removing blade; and
      a transfer roller having a transfer sheet, wherein the transfer sheet receives transfer of ink from the at least one recess,
   wherein the removing blade further removes residual ink from the transfer roller by releasing the pressurized gas toward the transfer roller.

2. The ink pattern printing apparatus of claim 1, further comprising a filling blade that supplies the ink onto the printing plate and into the at least one recess.

3. The ink pattern printing apparatus of claim 2, wherein the filling blade moves in a first direction while contacting the ink on the printing plate, and the removing blade moves in the first direction from behind the filling blade.

4. The ink pattern printing apparatus of claim 3, wherein the removing blade moves while maintaining a predetermined gap from the printing plate.

5. The ink pattern printing apparatus of claim 1, wherein the removing blade comprises a thin end and a thick end to form a wedge shape.

6. The ink pattern printing apparatus of claim 5, wherein the exhaust port comprises exhaust holes or lines at the thin end.

7. The ink pattern printing apparatus of claim 6, wherein the exhaust port extends parallel to a bottom of the removing blade.

8. The ink pattern printing apparatus of claim 7, wherein the removing blade moves parallel to the printing plate.

9. The ink pattern printing apparatus of claim 5, wherein the removing blade further comprises a rotary shaft that is disposed near the thick end and rotates the removing blade.

10. The ink pattern printing apparatus of claim 1, wherein the lower frame further comprises an ink collection tank that is disposed under the movement path of the removing blade and outside the printing plate.

11. The ink pattern printing apparatus of claim 10, wherein the lower frame further comprises an elevator disposed below the ink collection tank to lift and lower the ink collection tank.

12. The ink pattern printing apparatus of claim 11, wherein the upper frame further comprises an ink recycling device having a transport tube with an opened bottom facing the lower frame, the transport tube connecting the ink recycling device and the ink supply device.

13. The ink pattern printing apparatus of claim 1, further comprising a cleaning unit disposed above the upper frame, wherein the cleaning unit comprises a rotary roller and a cleaning cloth.

* * * * *